(12) United States Patent  
Zhang et al.

(10) Patent No.: US 8,266,255 B2  
(45) Date of Patent: *Sep. 11, 2012

(54) METHOD AND SYSTEM FOR CONFIGURING SETTINGS FOR A COMMUNICATIONS CLIENT UTILIZING HOST DEVICE DRIVERS

(75) Inventors: Haining Zhang, Kanata (CA); Maxime Matton, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 188 days.

This patent is subject to a terminal disclaimer.

(21) Appl. No.: 12/340,426

(22) Filed: Dec. 19, 2008

(65) Prior Publication Data

US 2009/0100156 A1  Apr. 16, 2009

Related U.S. Application Data

(63) Continuation of application No. 10/921,885, filed on Aug. 20, 2004, now Pat. No. 7,483,963.

(51) Int. Cl.  
G06F 15/177 (2006.01)

(52) U.S. Cl. .................. 709/220; 709/246

(58) Field of Classification Search .......... 709/203, 709/220, 221, 222, 223, 224  
See application file for complete search history.

(56) References Cited

U.S. PATENT DOCUMENTS

| 6,295,645 | B1* | 9/2001 | Brewer ........................ 717/178 |
| 6,349,274 | B1 | 2/2002 | Kay et al. |
| 6,658,459 | B1 | 12/2003 | Kwan et al. |
| 6,895,588 | B1 | 5/2005 | Ruberg |
| 7,213,044 | B2* | 5/2007 | Tjong et al. ................... 709/200 |
| 2002/0031166 | A1* | 3/2002 | Subramanian et al. ....... 375/130 |
| 2003/0045316 | A1 | 3/2003 | Tjong et al. |
| 2003/0149894 | A1* | 8/2003 | Bellinger et al. ............. 713/201 |
| 2004/0073912 | A1 | 4/2004 | Meza |
| 2004/0128587 | A1 | 7/2004 | Kenchammana-Hosekote et al. |
| 2004/0199920 | A1 | 10/2004 | Resch |
| 2006/0010107 | A1* | 1/2006 | Nguyen et al. .................... 707/3 |
| 2006/0031832 | A1 | 2/2006 | Kishida |

FOREIGN PATENT DOCUMENTS

WO     02062031 A2    8/2002

OTHER PUBLICATIONS

Companion, CompanionLink User's Guide 2001, Companionlink Software Inc.; 24 pages.

Hewlett Packard, "Communicator 3000 MPE/iX, Express 1 Based on Release 6.0", Internet Article, Onlink! vol. 10, No. 2, Jul. 1999, pp. 1-50 (Part 1), XP00239112 Palo Alto, USA.

Hewlett Packard, "Communicator 3000 MPE/iX, Express 1 Based on Release 6.0", Internet Article, Onlink! vol. 10, No. 2, Jul. 1999, pp. 51-94 (Part 2), XP00239112 Palo Alto, USA.

(Continued)

*Primary Examiner* — Barbara Burgess  
(74) *Attorney, Agent, or Firm* — Conley Rose, P.C.; J. Robert Brown, Jr.

(57) ABSTRACT

A system and method for configuring a client on a host device using a configuration application on a configuring device, the system comprising: a link between the configuring device and the host device; host drivers for communicating between the host device and the configuring device over the link; and an interface between the host drivers and the configuration application, wherein said interface allows said configuration application to be independent of the host drivers while allowing the configuration application to configure the client.

19 Claims, 4 Drawing Sheets

OTHER PUBLICATIONS

Haining, Zhang, et al.; U.S. Appl. No. 10/921,885, filed Aug. 20, 2004; Title: Method and System for Configuring Settings for a Communications Client Utilizing Host Device Drivers.

Office Action dated Oct. 5, 2007; U.S. Appl. No. 10/921,885, filed Aug. 20, 2004; 13 pages.

Final Office Action dated Apr. 29, 2008; U.S. Appl. No. 10/921,885, filed Aug. 20, 2004; 13 pages.

Advisory Action dated Jul. 16, 2008; U.S. Appl. No. 10/921,885, filed Aug. 20, 2008; 7 pages.

Notice of Allowance dated Sep. 22, 2008; U.S. Appl. No. 10/921,885, filed Aug. 20, 2004; 9 pages.

Canadian Office Action dated Nov. 14, 2008; Application No. 2,512,722 filed Mar. 16, 2010; 3 pages.

Canadian Notice of Allowance dated Jul. 14, 2009; Application No. 2,512,722 filed Mar. 16, 2010; 1 page.

\* cited by examiner

METHOD AND SYSTEM FOR CONFIGURING SETTINGS FOR A COMMUNICATIONS CLIENT UTILIZING HOST DEVICE DRIVERS

CROSS-REFERENCE TO RELATED APPLICATIONS

This continuation application claims priority to U.S. patent application Ser. No. 10/921,885 filed Aug. 20, 2004, by Haining Zhang, et al, entitled "Method and System for Configuring a Client on Host Devices by Utilizing an Interface Between a Configuration Application and Host Device Drivers on a Configuring Device", and which is incorporated by reference herein as if reproduced in its entirety.

FIELD OF THE APPLICATION

The present application deals with a method and system for configuring a communications client on a host device and, more specifically, to configuring a communications client using a standard configuration application and the host device's drivers.

BACKGROUND

In a host device, it is sometimes desirable to add a client onto the host to perform functionality that the host normally would not include. This could, for example, include the addition of a data client onto a mobile device. Other examples of adding a client to host device would, however, be known to those skilled in the art.

A configuration application for the client allows parameters to be set to ensure the proper functioning of the client. For example, in a client in which secure communications needs to be ensured, an encryption key could be set for the client to allow encrypted communications between a server and the client.

A host device typically includes a communication means for communicating with the device from an external source. Such external sources include, for example, personal computers with configuration programs on them. Drivers are needed on these external devices in order to communicate with the host device.

A problem with configuring a client that resides on a host device is that the drivers for each host device will be different and, therefore, the client configuration application needs to be changed for each different host device to allow communication with that host device.

SUMMARY OF THE INVENTION

The present system and method provides an abstract layer between a client configuration application and a set of host drivers in order to allow the configuration of a client on a host device without having to change the client configuration application. The client on the host device can thereby be configured regardless of the specific physical link between the host device and the configuring device.

A series of calls made between the client configuration application and the host drivers are defined in this abstract layer in order to ensure that the client configuration application has access to the client on the host device. These calls can be uniform regardless of the host device by having an abstract interface layer between the client configuration application and the host drivers.

The present application therefore provides a system for configuring a client on a host device using a configuration application on a configuring device, the system comprising: a link between the configuring device and the host device; host drivers for communicating between the host device and the configuring device over the link; and an interface between the host drivers and the configuration application, wherein said interface allows said configuration application to be independent of the host drivers while allowing the configuration application to configure the client.

The present application further provides a method for configuring a client on a host device from a configuration application on a configuring device, the host device being linked to the configuration device, the method comprising the steps of: adding a set of host drivers to the configuration device specific for the host device and link; and providing an interface between the configuration application and the set of host drivers, the interface being adapted to communicate with the host drivers, wherein the configuration application can communicate with the client without changing the configuration application for the host device or set of host drivers.

BRIEF DESCRIPTION OF THE DRAWINGS

The present system and method will be better understood with reference to the drawings in which.

DETAILED DESCRIPTION OF THE DRAWINGS

The system and method below will be described with relation to a data client on a host mobile device. However, this is not meant to limit the scope of the present system and method and other clients and hosts are considered to be within the scope of the present application. The use of a data client on a host device is used for illustration only.

The present system and method is directed to the configuration of a client on a host device. A data client will need to be configured for a variety of reasons from a configuration device such as a laptop or a desktop computer. For example, in a data client configuration parameters could include an encryption key for secure communication between a server and the host device and, ultimately, the client on the host device. Other configuration parameters could include a service book to set the server identifier that the client should communicate with. A configuration tool could also include a back-up/restore for client data such as e-mail or calendar events that a user wishes to restore or save.

Figure 1:
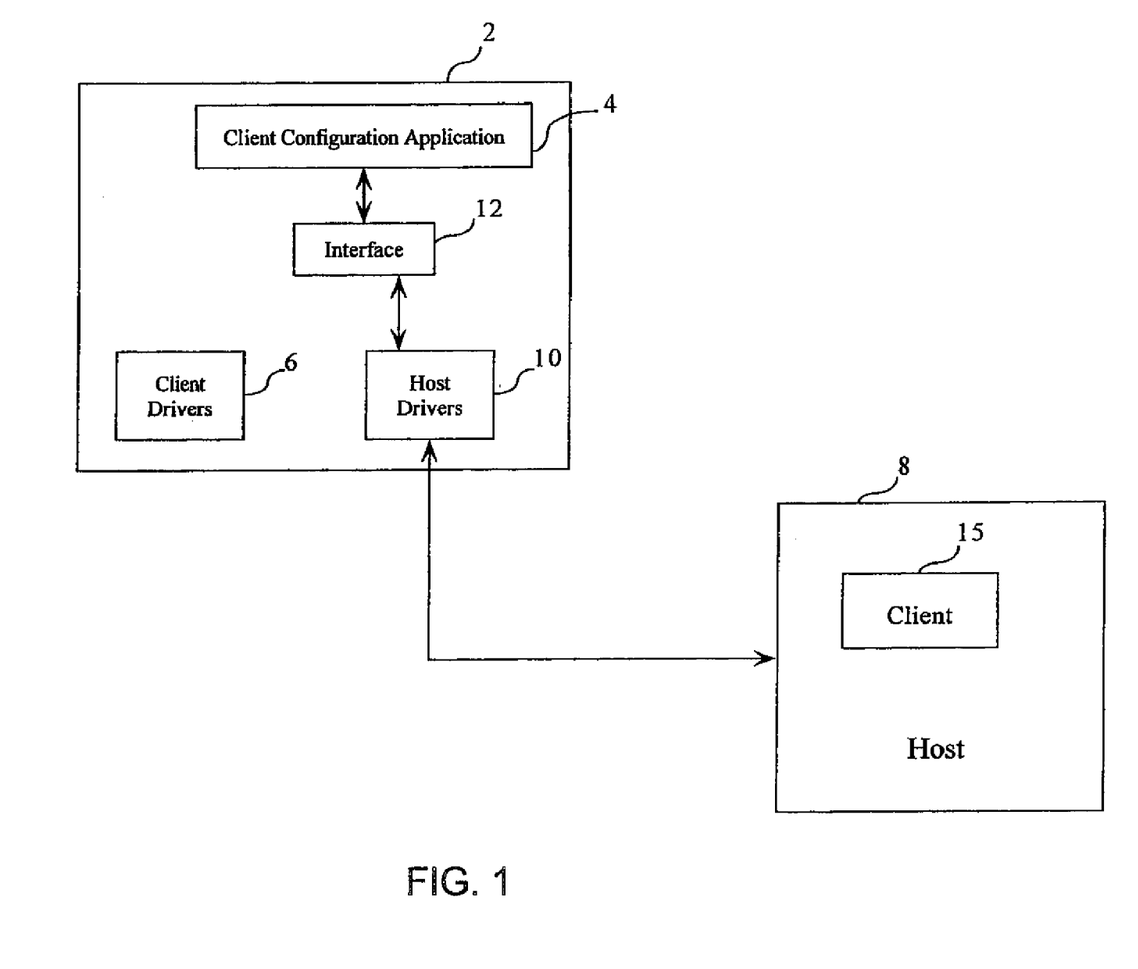
FIG. 1 is a schematic diagram of the components and data flow according to the present system and method.

Reference is made to FIG. 1. A client configuration application 4 is an application used to configure the parameters of a client. As indicated above, these could include encryption keys, backups, restores, service books or other parameters.

A client configuration application 4 is located on a configuration device 2 and would normally communicate with a client 15 on a native device (not shown) through native drivers 6. This is only available when the client is on its own device, and not on a host device.

If the client is instead configured to reside on a host device 8 the configuration device 2 will need to communicate with host device 8. This is accomplished through the use of drivers that the host device will recognize. In the preferred embodiment host drivers 10 are used to communicate with host device 8. Host drivers are known and reside on configuration device 2.

Configuration device 2 uses host drivers 10 to communicate over whatever physical link is available for the host device 8. This could include, but is not limited to, Universal Serial Bus (USB), Bluetooth, IrDA and serial ports.

As will be appreciated by one skilled in the art, various host devices 8 could be used. Each host device further could have a different physical link between the device and configuration device 2. Each host device 8 could also have different host drivers to communicate through that physical link.

If client configuration application 4 needs to communicate with a client, regardless of what host 8 the client is on, it is, undesirable that client configuration application 4 be re-written for each host device 8. Client configuration application 4 would continually need to be updated to allow communication with new devices or upgraded devices.

The present system and method therefore provides an interface 12 between a client configuration application 4 and host drivers 10. Interface 12 is an abstract layer used to convert calls by the client configuration application to a client device into calls to the host device 8. The advantage of adding interface 12 is that very little change needs to be made to existing client configuration application 4 and that any host 8 can be used merely by substituting a different implementation of interface 12.

In this way, if the client is on a first host device 8, a first interface implementation could be used. If a second host device is provided with a client, configuration device 2 merely adds another interface implementation 12 for the second host device, and the client configuration application 4 uses the second interface implementation 12 to communicate with the second host device 8.

As will be appreciated by one skilled in the art, a single configuration device 2 can be used to configure clients on a variety of host devices 8. When configuration device 2 is used to configure multiple host devices 8, multiple interface implementations 12 are added or present on configuration device 2.

Figure 2:
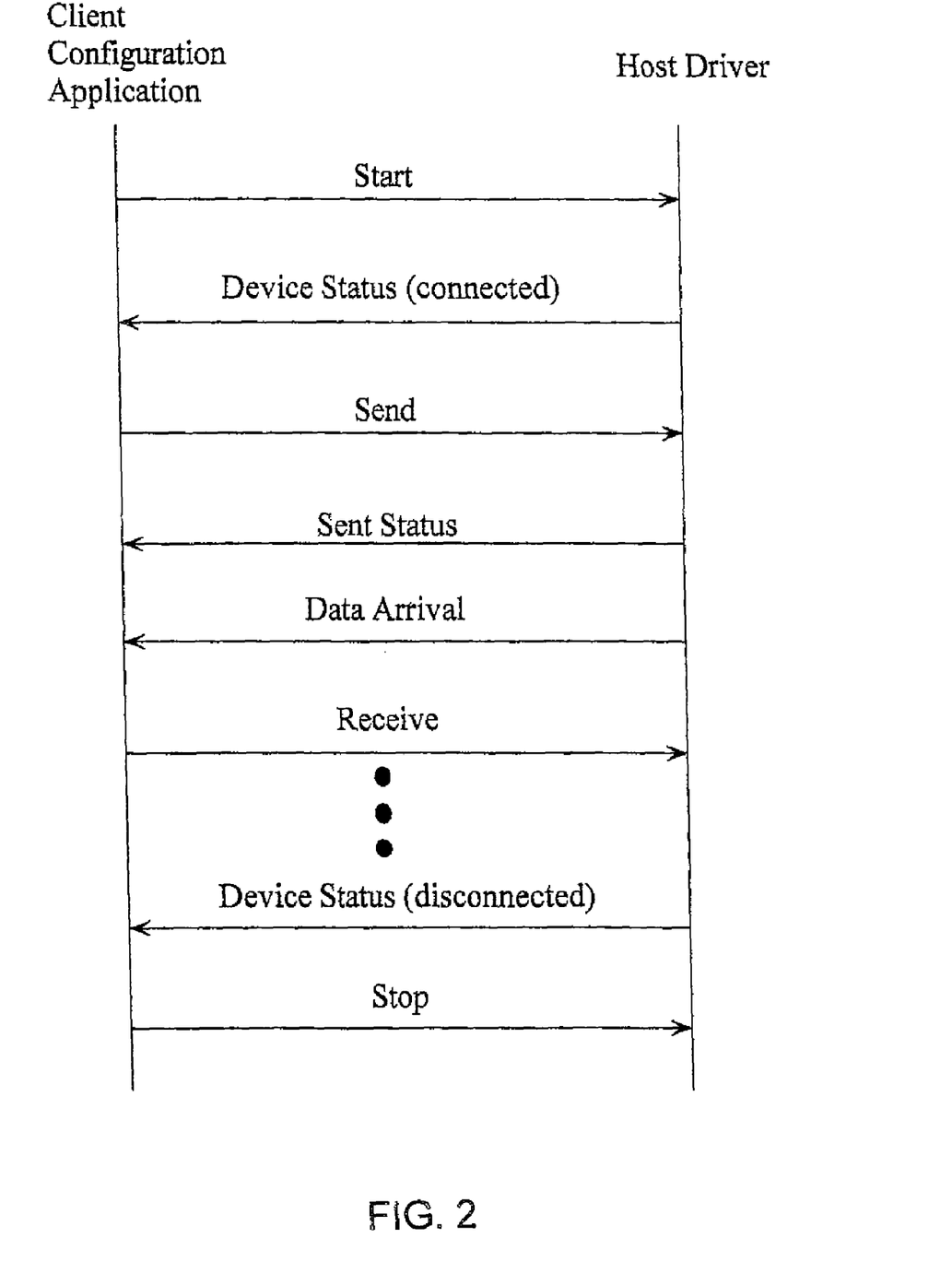
FIG. 2 is an example of data calls defined in the abstract layer between the client configuration application and the host drivers.

Reference is now made to FIG. 2. In order to provide communications between client configuration application 4 and host drivers 10, interface 12 includes a number of calls to host drivers 10 to allow communication with host device 8. FIG. 2 shows an example of function calls defined in the interface between client configuration application and the host drivers that could be used to send and receive data and to know the device status of the host device 8 within client configuration application 4. Other data calls would be known to those skilled in the art and could be used instead of the example of FIG. 2.

In FIG. 2, interface 12 first sends a start message to host drivers 10. This indicates to host drivers 10 that client configuration application has started and is awaiting to configure client 15 on host device 8.

When host device 8 is connected to configuration device 2, host drivers 10 learn of this connection and descend a device status (connected) message to client configuration application 4. Client configuration application 4 then knows that host device 8 is connected and that configuration for client 15 can occur.

In the example of FIG. 2, client configuration application 4 through interface 12 then uses a send command to host drivers 10. Host drivers 10 conveys data included in this send command to client 15 on host device 8 and a sent status message is sent back from host drivers 10 to interface 12. A sent status message is used to indicate whether or not the message data was sent successfully.

If data arrives on host drivers 10 from host device 8 that is meant for client configuration application 4, host drivers 10 can send a message "data arrival" through interface 12. Client configuration application 4 through interface 12 can then send a receive command to obtain the data that has arrived from host device 8.

Using the above messages and commands, data can be sent and retrieved from client 15 on host device 8. This continues until the host device 8 is disconnected from the configuration device 2. Upon disconnect, host drivers 10 send a message "device status (disconnected)" to interface 12 which lets client configuration application 4 know that it can no longer configure client 15.

Client configuration application 4 then sends a stop command to host drivers 10 that it is no longer communicating with host drivers 10.

Based on the above, interface 12 provides an abstract layer between client configuration application 4 and host drivers 10 which allows communications to and from a client 15 on a host device 8 without having to modify client configuration application 4.

Figure 3:
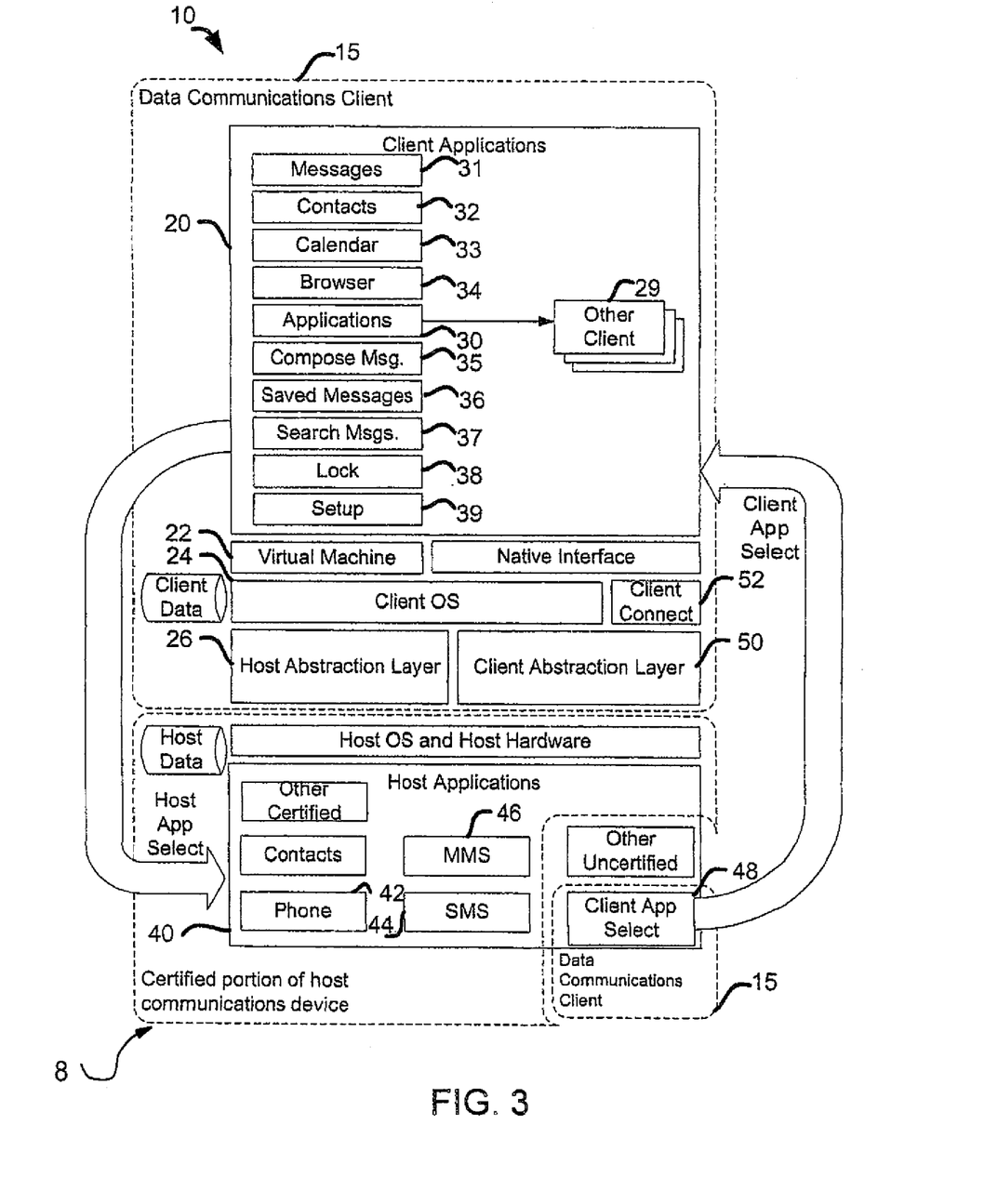
FIG. 3 is a block diagram of an example architecture of a client on a host device.

While the relationship between a client and a host on host device 8 can include a variety of configurations that would be known to those skilled in the art, in one embodiment the client 15 and host are divided into an architecture that includes client applications 20 for client 15 running on top of a virtual machine 22. Reference is now made to FIG. 3.

Client applications 20 can be any application that is designed to run on a virtual machine 22. In the example of FIG. 3, these could include a messages application 31 for viewing messages that have been received, a contacts application 32, which presents an address book including phone numbers, e-mail addresses or other contact information for individuals or companies, a calendar application 33 for scheduling appointments and managing time, a browser application 34 for browsing the internet or other network, a compose-message application 35 to compose messages for SMS or e-mail, a save-messages application 36 to view messages that have been saved, a search-messages application 37 to search for a particular message, a lock application 38 to lock the keyboard and screen of the mobile device, and a set-up application 39 to change the set-up configuration for client 15. Other applications 30 could also exist as part of client applications 20 and the above-listed applications are not meant to be limiting. Further, other clients besides client 15 could exist on host device 8 and these other clients could have applications 29 which could be invoked from application 30.

Virtual machine 22 is preferably started at power-up of host device 8 and stays running no matter what. In one preferred embodiment, virtual machine 22 is a JAVA virtual machine and client applications 20 are JAVA applications.

All client applications 20 use virtual machine 22 to invoke instances of objects created by client applications 20.

A feature such as a hardware call from client applications 20 would normally go through client OS 24. Client OS 24 includes a number of primitives for interacting with hardware. However, in the case that client applications 20 are built onto a host device, it is preferable that instead of interacting with features directly, client OS 24 interacts with the host abstraction layer 26. Host abstraction layer 26 converts calls from client applications 20 to host calls through a native interface 28. Native interface 28 invokes host applications 40 in order to use the host-dependent features on the host device.

In order to start one of the above applications, it is desirable that a client application can be activated from a host application 40. When an application is selected in the host environment, a client application selection application 48 uses a set of application program interfaces (APIs) by which the host operating system can request a client application 20 to activate.

Client application selection application 48 uses a client abstraction layer 50 to activate an application within client applications 20. Client application selection application 48 calls a function that is translated in client abstraction layer 50. Client abstraction layer 50 then uses virtual machine 22 to activate a client application 20.

Client abstraction layer 50, in alternative embodiments, can either inject the client OS 24 event into virtual machine 22 which causes the selected client application 20 to become active or, alternatively, performs a "reverse-native call", either through client OS 24 or via client connect 52 to manipulate the native representation of some client object which causes the selected client application 20 to become active.

In the configuration of a client 15 on a host device 8, a client application 20 for configuring client 15 can be started and can use data received from configuration device 2 to configure client 15. This client can be started as a result of a call from host driver 10 on configuration device 2. This call is received by host device 2 and through a client application selection application 40 starts a client application 20 for configuring client 15.

Figure 4:
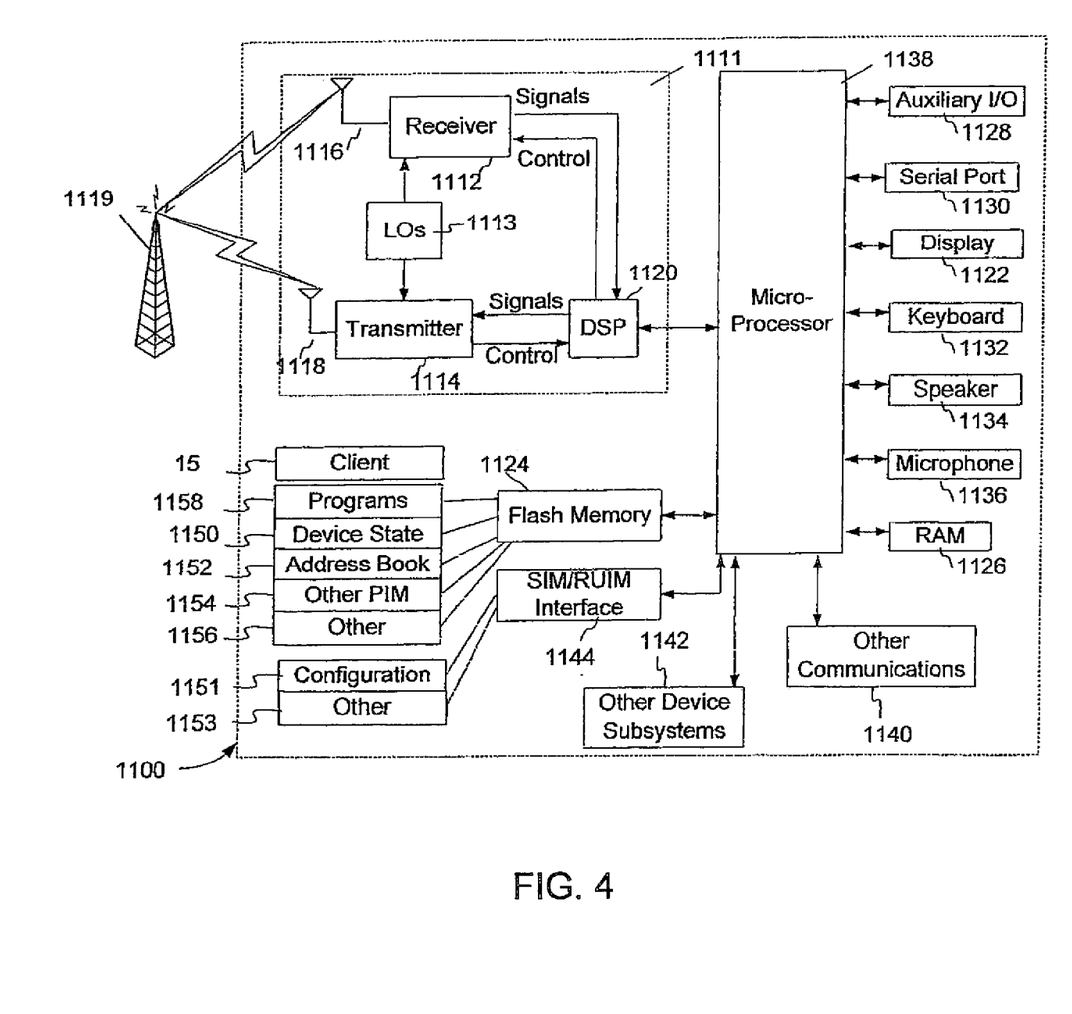
FIG. 4 is a block diagram illustrating a host mobile station.

Reference is now made to FIG. 4. FIG. 4 is a block diagram illustrating a host mobile station including preferred embodiments of the techniques of the present application. Mobile station 1100 is preferably a two-way wireless communication device having at least voice and data communication capabilities. Mobile station 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile station 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile station 1100 is registered on the network using a unique identification number associated with each mobile station. In UMTS and GPRS networks, and in some CDMA networks, however, network access is associated with a subscriber or user of mobile station 1100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as "911" emergency calling, may be available, but mobile station 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile station 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems (not shown). For example, network 1119 may communicate with both an enterprise system and a web client system in order to accommodate various clients with various service levels.

Mobile station 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 4 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile station. A predetermined set of applications that control basic operations, including at least data and voice communication applications for example, will normally be installed on mobile station 1100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile station user's corresponding data items stored or associated with a host computer system. Further applications may also be loaded onto the mobile station 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile station 1100.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile station 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile station 1100 is similar, except that received signals would preferably be output to a speaker 1134 and signals for transmission would be generated by a microphone 1136. Alternative voice or audio I/O subsystems, such as a voice message recording subsystem, may also be implemented on mobile station 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 4 would normally be implemented in a personal digital assistant (PDA)-type mobile station for which synchronization with a user's desktop computer as outline above. Such a port 1130 enables a user to set preferences through an external device or software application and would extend the capabilities of mobile station 1100 by providing for information or software downloads to mobile station 1100 other than through a wireless communication network. As indicated above, the alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile station 1100 and different systems or devices, which need not necessarily be similar devices. For example, the subsystem 1140 may include an infrared device and associated circuits and components or a Bluetooth™ communication module to provide for communication with similarly enabled systems and devices.

The above-described embodiments are meant to be illustrative of preferred embodiments and are not intended to limit the scope of the present application. Also, various modifications, which would be readily apparent to one skilled in the art, are intended to be within the scope of the present application. The only limitations to the scope of the present application are set forth in the following claims.

We claim:

1. A configuration device for configuring a client on host devices, comprising:
   an application to configure one or more parameters of the client on the host devices;
   host drivers to promote communication between the each of the host devices to be configured and the configuring device; and
   an interface between the host drivers and the application, the interface configured to convert instructions from the application into instructions useable by the host drivers to communicate with each of the host devices to be configured, wherein a first implementation of the interface enables the application to configure the client on a first one of the host devices via a first one of the host drivers and wherein a second implementation of the interface enables the application to configure the client on a second one of the host devices via a second one of the host drivers.

2. The configuration device of claim 1, further comprising a link to enable communication between the configuration device and the host devices, the link selected from the group consisting of: a Bluetooth connection; an IrDA connection; and a physical serial link.

3. The configuration device of claim 1, wherein the configuration device is a personal computer.

4. The configuration device of claim 3, wherein the client is a data client.

5. The configuration device of claim 4, wherein configuring the client includes setting an encryption key.

6. The configuration device of claim 4, wherein configuring the client includes backing up and restoring data.

7. The configuration device of claim 4, wherein configuring the client includes setting parameters in a service book.

8. A computer-implemented method for configuring a client on host devices via a configuration device, the method comprising the steps of:
   configuring one or more parameters of the client on the host devices;
   adding a set of host drivers to the configuration device specific for the host device; and
   providing an interface between an application and the set of host drivers, the interface being adapted to communicate with the host drivers, the interface configured to convert instructions from the application into instructions useable by the host drivers to communicate with each of the host devices to be configured, wherein a first implementation of the interface enables the application to configure the client on a first one of the host devices via a first one of the host drivers and wherein a second implementation of the interface enables the application to configure the client on a second one of the host devices via a second one of the host drivers.

9. The method of claim 8, wherein one of the host devices is a mobile device.

10. The method of claim 8, wherein the client is a data client.

11. The method of claim 10, wherein configuring the client involves setting an encryption key.

12. The method of claim 10, wherein configuring the client involves setting a server identifier.

13. The method of claim 10, wherein configuring the client includes backing up and restoring data.

14. A host device for configuring a client, the host device having a divided architecture comprising:
   client applications;
   host applications;
   a virtual machine for the client applications; and
   an interface between the host applications and client applications configured to permit the client applications to start the host applications and the host applications to start the client applications using the virtual machine, wherein responsive to communication received by at least one of the host applications from a host driver of a configuration device, the at least one of the host applications initiating one of the client applications to configure the client.

15. The host device of claim 14, wherein the host device is a mobile device.

16. The host device of claim 14, wherein the client is a data client.

17. The host device of claim 16, wherein configuring the client involves setting an encryption key.

18. The host device of claim 16, wherein configuring the client involves setting a server identifier.

19. The host device of claim 16, wherein configuring the client includes backing up and restoring data.

* * * * *